United States Patent
Neubecker et al.

(10) Patent No.: US 9,555,814 B2
(45) Date of Patent: Jan. 31, 2017

(54) UNEXPECTED THERMAL EVENT ASSIST

(71) Applicant: Ford Global Technologies, LLC, Dearborn, MI (US)

(72) Inventors: Cynthia M. Neubecker, Westland, MI (US); Laura Viviana Hazebrouck, Birmingham, MI (US); Brad Alan Ignaczak, Canton, MI (US); Brian Bennie, Sterling Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/500,137

(22) Filed: Sep. 29, 2014

(65) Prior Publication Data

US 2016/0090105 A1     Mar. 31, 2016

(51) Int. Cl.
*B60W 50/14* (2012.01)
*G08B 17/06* (2006.01)
*A62C 3/07* (2006.01)
*G08B 25/00* (2006.01)
(Continued)

(52) U.S. Cl.
CPC ............ *B60W 50/14* (2013.01); *A62C 3/07* (2013.01); *G08B 17/06* (2013.01); *B60W 2050/143* (2013.01); *G08B 25/009* (2013.01); *G08B 25/08* (2013.01); *G08B 25/10* (2013.01)

(58) Field of Classification Search
CPC .. B60W 50/14; B60W 2050/143; G08B 17/06
See application file for complete search history.

(56) References Cited

U.S. PATENT DOCUMENTS 5,389,935 A * 2/1995 Drouault .................. G01S 5/04
                                                        340/426.15
7,899,616 B2    3/2011 Breed
(Continued)

FOREIGN PATENT DOCUMENTS

CN          101774172 A     7/2010
CN          102698387 A    10/2012
(Continued)

*Primary Examiner* — Rodney Butler
*Assistant Examiner* — Frederick Brushaber
(74) *Attorney, Agent, or Firm* — Franklin A. MacKenzie; Brooks Kushman P.C.

(57) ABSTRACT

A vehicle system may include a thermal sensor; and a vehicle connectivity module in communication with the thermal sensor and a plurality of vehicle systems configured to receive an indication, from the thermal sensor, indicative of detection of a thermal event external to the vehicle, and responsive to the detection, utilize at least one of the plurality vehicle systems to perform at least one assistance feature to provide notification of the thermal event. A computer-implemented method may include activating a vehicle connectivity module responsive to detection of a thermal event external to the vehicle by a vehicle thermal sensor, confirming, by the vehicle connectivity module, the detection of the thermal event by utilizing other thermal sensor inputs of the vehicle, and responsive to the confirmation, commanding a vehicle system to perform at least one assistance feature to provide notification of the thermal event to a user.

20 Claims, 4 Drawing Sheets

(51) Int. Cl.
  *G08B 25/08* (2006.01)
  *G08B 25/10* (2006.01)

(56) References Cited

U.S. PATENT DOCUMENTS

| | | | | |
|---|---|---|---|---|
| 2002/0101366 A1* | 8/2002 | Flick | ............ | B60R 25/04 340/988 |
| 2002/0105442 A1* | 8/2002 | Flick | ............ | B60R 25/04 340/988 |
| 2002/0105443 A1* | 8/2002 | Flick | ............ | B60R 25/04 340/988 |
| 2002/0116588 A1* | 8/2002 | Beckert | ............ | G06F 11/1441 711/161 |
| 2003/0033064 A1* | 2/2003 | Amberkar | ............ | B62D 15/0235 701/41 |
| 2007/0276795 A1* | 11/2007 | Poulsen | ............ | G06Q 90/00 |
| 2008/0051964 A1* | 2/2008 | Maeda | ............ | B60T 7/18 701/70 |
| 2008/0077324 A1* | 3/2008 | Hatano | ............ | G01C 21/367 701/455 |
| 2008/0264652 A1* | 10/2008 | Baccelli | ............ | A62C 3/07 169/62 |
| 2009/0082963 A1* | 3/2009 | Motoyama | ............ | G01C 21/26 701/469 |
| 2009/0326735 A1* | 12/2009 | Wood | ............ | G05D 1/0027 701/2 |
| 2010/0202368 A1* | 8/2010 | Hans | ............ | H04M 3/5116 370/329 |
| 2010/0204877 A1* | 8/2010 | Schwartz | ............ | B60R 25/00 701/31.4 |
| 2011/0077864 A1* | 3/2011 | Konijnendijk | ............ | G01S 13/723 701/301 |
| 2011/0130906 A1* | 6/2011 | Mayer | ............ | G07C 5/008 701/22 |
| 2011/0130916 A1* | 6/2011 | Mayer | ............ | G07C 5/008 701/31.4 |
| 2011/0202185 A1* | 8/2011 | Imes | ............ | H04L 43/08 700/277 |
| 2012/0016546 A1* | 1/2012 | Nilssen | ............ | H02J 9/062 701/22 |
| 2012/0046859 A1* | 2/2012 | Imes | ............ | G05D 23/1905 701/409 |
| 2012/0208492 A1* | 8/2012 | Tschofenig | ............ | H04M 3/5116 455/404.2 |
| 2014/0310412 A1* | 10/2014 | Shinohara | ............ | B63B 49/00 709/224 |

FOREIGN PATENT DOCUMENTS

| | | |
|---|---|---|
| CN | 202838583 A | 3/2013 |
| EP | 0687594 A1 | 6/1995 |
| GB | 2438435 A | 11/2007 |
| JP | 2012005331 A | 1/2012 |

* cited by examiner

UNEXPECTED THERMAL EVENT ASSIST

TECHNICAL FIELD

Aspects of this disclosure relate to assistance for detecting unexpected emergency thermal events and assistance in managing the response performed using vehicle systems.

BACKGROUND

Home fires and extreme cold often result in damage to property and harm to persons and animals. In some cases, such events may be substantially mitigated by detection of the event and early warning to specific personnel. Even though many homes are already equipped with some form of smoke and/or fire detection sensors, there are cases in which these sensors are ineffective with respect to detecting the event and warning such personnel.

SUMMARY

In a first illustrative embodiment, a system includes a thermal sensor; and a vehicle connectivity module in communication with the thermal sensor and a plurality of vehicle systems configured to receive an indication from the thermal sensor indicative of detection of a thermal event external to the vehicle, and responsive to the detection, utilize at least one of the plurality of vehicle systems to perform at least one assistance feature to provide notification of the thermal event.

In a second illustrative embodiment, a vehicle includes a processor configured to receive an indication, from a thermal sensor of the vehicle, indicative of detection of a thermal event external to the vehicle and within a structure in which the vehicle is located, and responsive to the detection, performing assistance features including autonomously moving the vehicle out of the structure away from the thermal event if such movement may protect the vehicle.

In a third illustrative embodiment, a computer-implemented method includes activating a vehicle connectivity module responsive to detection of a thermal event external to the vehicle by a vehicle thermal sensor, confirming, by the vehicle connectivity module, the detection of the thermal event by utilizing other thermal sensor inputs of the vehicle, and responsive to the confirmation, commanding at least one of the plurality vehicle systems to perform at least one assistance feature to provide notification of the thermal event to a user.

DETAILED DESCRIPTION

Figure 1:
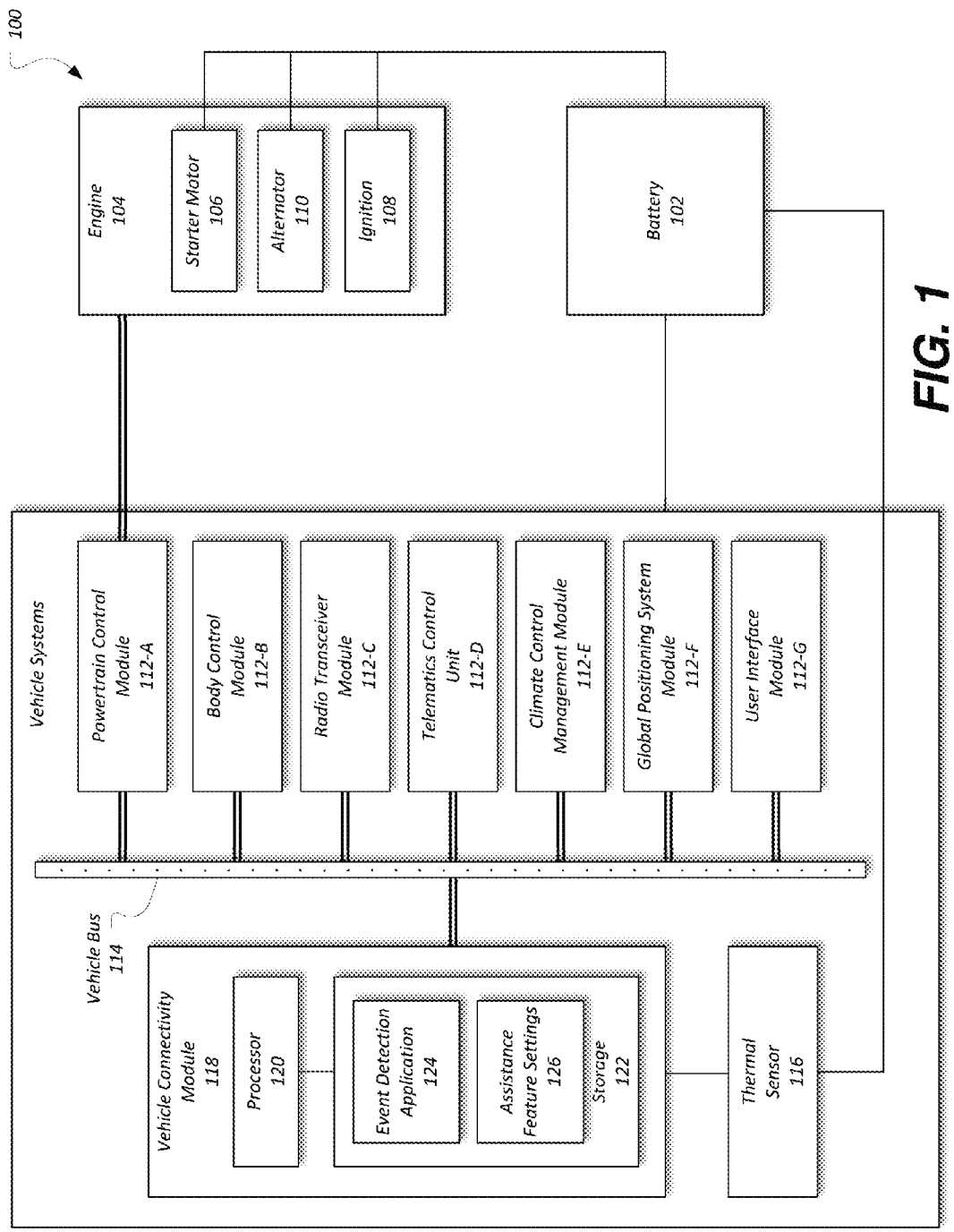
FIG. 1 illustrates an example vehicle implementing assistance features activated based on unexpected thermal event detection.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle may include one or more thermal sensors configured to detect unexpected thermal events. The term "thermal events" as used in this document refers generally to unexpected increases in temperature (whether measured by direct evidence of temperature differential or by indirect evidence such as via photoelectric or ionization sensors), but could also include unexpected severe drops in temperature that could result in damage to home or building plumbing, safety of animals outdoors and other severe cold risks where a garaged vehicle may provide advance notice of the severe condition. In order to prevent the thermal sensors from responding to natural temperature extremes, the system may include a rolling average baseline temperature that tracks natural ambient temperature but is able to detect a rapid change over a short period of time that may be indicative of a nearby fire. For example, a vehicle stored in a garage in Arizona may see a local ambient in excess of 50° Celsius (120° Fahrenheit). If that reading was to rise 20-30° in a few minutes this would likely correlate to a potential nearby thermal event. For cold temperature, the filtering of unexpected thermal events may be slower.

If an unexpected thermal event is detected, the vehicle may activate a vehicle connectivity module to enable thermal event assistance features. In an example, the thermal sensor may be configured to complete a connection between the vehicle connectivity module and the battery when the thermal event is detected, so as to cause the vehicle connectivity module to activate and establish a cellular, WiFi, or other wireless communication session with a remotely located transceiver either in a different part of the structure or a different geographic location or activate other means of notifying users of the system of potential risks.

The assistance features may include, as some non-limiting examples, (i) utilizing an in-vehicle embedded modem or paired cell phone to made a call for assistance (e.g., to 911) or to send an alert message requesting assistance, (ii) activating vehicle hazard lights, (iii) activating a horn chirp (e.g., activation of the vehicle perimeter alarm), (iii) invoking an alert function of a two-way key fob, (iv) making a call or sending a message to a predetermined contact, (v) providing illumination to the area using one or more lights of the vehicle, (vi) opening a garage or other door to the enclosed space in which the vehicle is located, (vii) waking or otherwise informing other vehicles of the unexpected thermal event, and (viii) autonomously moving one or all of the vehicles at risk to another location. (In this case the vehicles would be required to be equipped with autonomous technology.) The vehicle may remain in the emergency mode until receiving manual intervention to return to normal mode, or until the vehicle runs out of battery or is damaged such that the vehicle assistance functions no longer operate.

In some cases, the assistance features may be enabled or disabled based on vehicle location. For instance, a vehicle may maintain assistance feature settings configured to enable predefined assistance features based on detection of the vehicle being at a predefined geographic location (such as when parked inside or near a house garage or carport). In an example, the vehicle may be configured to enable the assistance features based on a global positioning system (GPS) location where the vehicle was turned off (e.g. when the vehicle is keyed off within a range (500 m) of an established home location). In another example, the vehicle may be configured to enable the assistance features when the vehicle is determined to be within a predetermined range from a house, condo, or other habitable building. In yet another example, the assistance features may be disabled when the vehicle is not at a home location, such as located in a public parking lot. If the vehicle is not at a home location, the human-machine interface (HMI) of the vehicle may be configured to confirm when the vehicle is turned off whether owner would like the assistance features to be enabled at the current vehicle location.

FIG. 1 illustrates an example vehicle 100 implementing assistance features activated based on unexpected thermal event detection. As illustrated, the vehicle 100 includes a battery 102, an engine 104, a plurality of vehicle systems 112, one or more vehicle buses 114 and a vehicle connectivity module 118. The vehicle systems 112 and vehicle connectivity module 118 may be in communication over the bus 114 and configured to perform various vehicle functions under the power of the vehicle battery 102. The vehicle 100 further includes a thermal sensor 116, and an event detection application 124 installed to the vehicle connectivity module 118. As explained in greater detail below, the vehicle connectivity module 118 receives input from the thermal sensor 116 based on detection of the unexpected thermal event, and activates one or more assistance features of the system modules 112 according to assistance features settings 126 and responsive to the event detection.

The battery 102 may include various types of rechargeable battery configured to supply electric energy to various components of the vehicle 100. In an example, the battery 102 may be a 12 Volt lead-acid battery. The battery 102 may be configured to power the starter motor 106 and the ignition system 108 of the engine 104 when the engine 104 is not running, and may receive electric charge from the alternator 110 when the engine 104 is running. In another example, the battery 102 may include a traction battery or battery pack configured to store energy that can be used by one or more electric machines of the vehicle 100 that can provide propulsion and deceleration capability.

The plurality of vehicle systems 112 may be configured to perform various vehicle functions under the power of the vehicle battery 102. As depicted, the example vehicle systems 112 are represented as discrete modules 112-A through 112-G. However, the vehicle systems 112 may share physical hardware, firmware, and/or software, such that the functionality from multiple modules 112 may be integrated into a single module 112, and that the functionality of various such modules 112 may be distributed across a plurality of modules 112.

As some non-limiting module 112 examples: a powertrain control module 112-A may be configured to provide control of engine 104 operating components (e.g., idle control components, fuel delivery components, emissions control components, etc.) and for monitoring status of such engine operating components (e.g., status of engine fault codes); a body control module 112-B may be configured to manage various power control functions such as exterior lighting, interior lighting, keyless entry, remote start, and point of access status verification (e.g., closure status of the hood, doors and/or trunk of the vehicle 100); a radio transceiver module 112-C may be configured to send and receive messages by way of a wireless network or paired communications device; a telematics control unit 112-D may be configured to send and receive commands from the paired communications device or wireless network connection using the facilities of the radio transceiver module 112-C (e.g., to provide low battery alerts to a driver's phone or to a web database); a climate control management module 112-E may be configured to provide control of heating and cooling system components (e.g., compressor clutch, blower fan, temperature sensors, etc.); a global positioning system (GPS) module 112-F may be configured to provide vehicle location information; and a user interface module 112-G may be configured to provide vehicle status information to a driver, such as fuel level info, engine operating temperature information, and current location of the vehicle 100. Although not shown, the vehicle 100 may also be configured to perform acquisition of video images from external cameras (e.g., 360 Degree Camera system, Reverse Parking Cameras, Lane Departure Warning, etc.) and transmit these images to off-board to allow recipients to see some level of first-hand evidence of the conditions surrounding the vehicle sending the alert.

The vehicle bus 114 may include various method of communication available between the system modules 112, as well as between the vehicle connectivity module 118 and the system modules 112. As some non-limiting examples, the vehicle bus 114 may include a controller area network (CAN) bus and/or an Ethernet network.

The thermal sensor 116 may be configured to detect unexpected thermal events. For example, when the thermal sensor 116 detects the unexpected thermal event, the sensor may be configured to close a circuit or otherwise change electrical properties to notify a system to which the thermal sensor 116 is connected. In an example, the thermal sensor 116 may be cold engine lockout switch (e.g., configured to close a circuit when a temperate exceeds approximately 50 degrees Celsius/120 degrees Fahrenheit). In another example, the thermal sensor 116 may include electrodes separated by wax, such that when the temperature surrounding the sensor increases, the wax melts and the electrodes close an electrical link.

The vehicle connectivity module 118 may include various types of computing apparatus to facilitate the performance of the functions of the vehicle connectivity module 118. In an example, the vehicle connectivity module 118 may include a processor 120 configured to execute computer instructions, and a storage medium 122 on which the computer-executable instructions may be maintained. A computer-readable storage medium 122 (also referred to as a processor-readable medium 122 or storage 122) includes any non-transitory (e.g., tangible) medium that participates in providing data (e.g., instructions) that may be read by a computer (e.g., by the processor 120). In general, a processor 120 receives instructions, e.g., from the storage 122, etc., and executes these instructions, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Java Script, Perl, PL/SQL, etc.

In an example, the thermal sensor 116 may be connected to the vehicle connectivity module 118, such that when the thermal sensor 116 detects an unexpected thermal event, the thermal sensor 116 closes a link on an electrical connection to the vehicle battery 102, waking the vehicle connectivity module 118. Once awake, the vehicle connectivity module 118 may activate the event detection application 124 included on the storage 122 of the vehicle connectivity module 118.

The event detection application 124 may further be configured to, when activated by the vehicle connectivity module 118, cause the vehicle connectivity module 118 to utilize other sensor inputs of the vehicle 100 to confirm the unexpected thermal event. In an example, the event detection application 124 may be configured to query the climate control management module 112-E for temperature information from temperature sensors of the climate control system (e.g., measuring ambient temperature, cabin temperature, sun load) to determine a potential non-emergency weather-based cause for the thermal event (e.g., a hot sunny day), and therefore that an unexpected thermal event has not occurred. In another example, the event detection application 124 may be configured to query the powertrain control module 112-A for information regarding engine temperature, oil temperature, coolant temperature, or other temperature information from the vehicle 100 that may be indicative of normal heat resulting from recent use of the engine 104 (e.g., that the engine temperature is decreasing in temperature normally).

The event detection application 124 may further include instructions configured to, when an unexpected thermal event occurs, cause the vehicle connectivity module 118 to issue one or more commands to the vehicle modules 112 to activate one or more assistance features of the system modules 112. The assistance features settings 126 may include information indicative of the configuration of the assistance features to be performed when an unexpected thermal event is identified and/or confirmed.

For example, the assistance features may include features for notifying others of the detected event. These notification assistance features may include, for example: (i) commanding the telematics control unit 112-D to utilize an in-vehicle modem to call an emergency phone number (e.g., 9-1-1) or other numbers on a priority based calling list, (ii) commanding the body control module 112-B to invoke a horn chirp such as a perimeter alarm, (iii) commanding the radio transceiver module 112-C to send a message to a two-way key fob (e.g., to cause the key fob to provide a haptic, visual, or audible alert), and/or (iv) commanding the telematics control unit 112-D to utilize an in-vehicle modem to call or send a text message to the owner of the vehicle 100 and/or a predefined emergency contact.

The assistance features may additionally or alternatively include features requesting the vehicle 100 to perform actions to attempt to mitigate the detected event. As one possibility, the assistance features may include providing alternative illumination in the vicinity of the thermal event. For example, the event detection application 124 may be configured to cause the vehicle connectivity module 118 to command the body control module 112-B to invoke lighting features (e.g., by way of one or more of vehicle cabin lights, headlights, daytime-running lights, and/or reverse lights of the vehicle 100). This may be done, for example, to provide light to enhance the image quality of vehicle cameras (e.g., vehicle rearview camera, etc.) configured to provide video of the vehicle 100 location to a remote location (e.g., via the telematics control unit 112-D services), or to act as an emergency lighting, in case vehicle 100 surroundings are poorly lit.

As another possibility of a vehicle 100 attempt to mitigate the detected event, the assistance features may include requesting the vehicle 100 to open one or more garage doors of a garage in which the vehicle 100 detecting the event is located. For example, the event detection application 124 may be configured to cause the vehicle connectivity module 118 to command the radio transceiver module 112-C (or another dedicated radio module) to provide a wireless Homelink message to open the garage door. As another example, the event detection application 124 may be configured to cause the vehicle connectivity module 118 to command the telematics control unit 112—to utilize the internal model to send a network control message to open the garage door. Opening the garage door may be a risk for garage contents, but it may also alert others (e.g., neighbors, emergency personnel, etc.) of the situation. The vehicle 100 may also invoke a vehicle camera (e.g., vehicle rearview camera, etc.) configured to provide video of the vehicle 100 location to a remote location to enable monitoring of the open door surroundings.

The event detection application 124 may be further configured to discontinue the assistance features based on one or more of: a manual intervention, expiration of a timer, and disablement of vehicle function due to the unexpected thermal event itself.

In some cases, multiple vehicles 100 within the vicinity of the detected event may cooperate to perform assistance features. In an example, if a first vehicle 100 detects a thermal event, the first vehicle 100 may utilize the radio transceiver module 112-C to perform vehicle-to-vehicle communication to locate other vehicles 100 in the vicinity of the first vehicle 100 and to collaborate with those other located vehicles 100. In another example, if the first vehicle 100 detects a thermal event, the first vehicle 100 may utilize the telematics control unit 112-D to request a third party server to determine GPS locations of other vehicles 100 in proximity to the first vehicle 100 and wake those other vehicles 100 so they may collaborate with performance of the assistance features. As a possible collaboration, the first vehicle 100 may monitor the vehicle battery 102 and enable a secondary vehicle 100 to continue the assistance features when the charge level of the battery 102 of the first vehicle 100 falls below a predetermined threshold value. As another possible collaboration, the first vehicle 100 and other vehicles 100 may collaborate on concurrent assistance features, such as by each providing visual and/or audible warnings of the detected event.

In some cases, the event detection application 124 may be configured to perform assistance features based on the current location of the vehicle 100. In an example, the vehicle 100 may utilize the global positioning system module 112-F to determine a GPS location of the vehicle 100 at key-off, and may determine, based on that location and the assistance features settings 126, whether assistance features should be enabled (or which assistance features should be enabled). As some possibilities, the assistance features settings 126 may be set to enable assistance features within some range (e.g., 500 meters) of a pre-defined home location; enable assistance features when within a pre-defined range of any house, condo, or other habitable building (e.g., determined according to map information and current GPS location); and disable assistance features when the vehicle 100 is parked in a public parking lot.

As another possibility, if the vehicle 100 is not at the home location, the event detection application 124 may be configured to query the user using the user interface module 112-G to request input regarding whether the vehicle 100 owner/occupant requests that assistance features be enabled at the current vehicle 100 location. If such input is provided, the event detection application 124 may be configured to maintain the information in the assistance feature settings 126 for future visits to the location.

Figure 2:
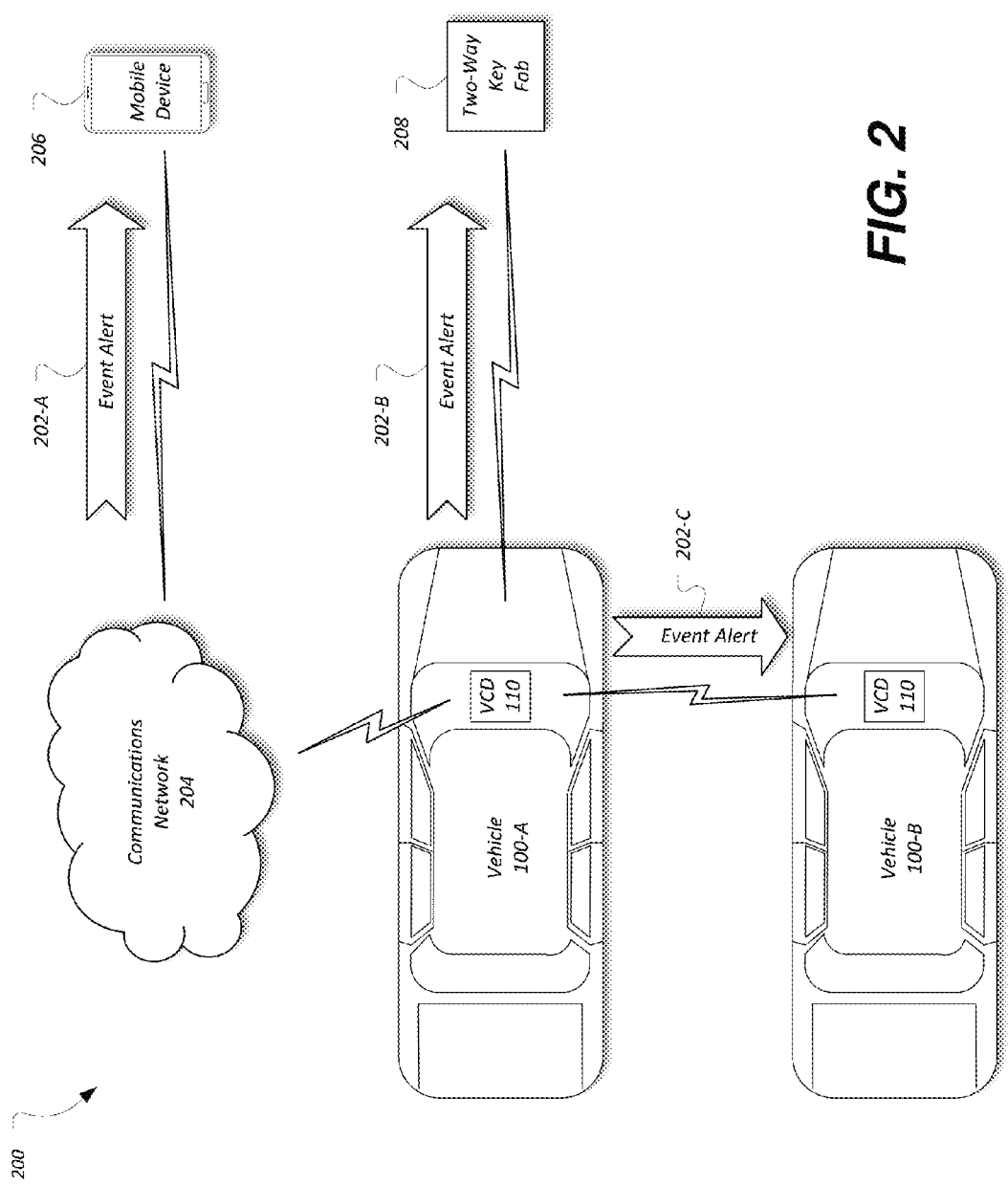
FIG. 2 illustrates an example notification using a vehicle implementing assistance features activated based on unexpected thermal event detection.

FIG. 2 illustrates an example diagram 200 of a vehicle 100-A providing event alerts 202 to various other devices. The event alert 202 may include information configured to alert a recipient of the event alert 202 to the thermal event detected by the vehicle 100-A. The various other devices may include, as some examples, a mobile device 206, a two-way key fob 208, and another vehicle 100-B.

The event alert 202 may include various types of information that may be useful to a recipient of the event alert 202. In an example, the event alert 202 may include position information (e.g., GPS coordinates of the vehicle 100-A requested by the vehicle connectivity module 118 from the global positioning system module 112-F). As another possibility, the event alert 202 may include information indicative of the identity of the vehicle 100-A such as a vehicle identification number (VIN), a phone number of the vehicle 100-A, an identifier of a user account associated with the vehicle 100-A (e.g., an email address, a unique driver identifier, etc.). As yet a further possibility, the event alert 202 may include time information indicative of the time of detection of the thermal event. In some cases, the event alert 202 may include commands requested by the vehicle 100-A to be performed by a recipient of the event alert 202. As an example, the event alert 202 may include a command requesting the recipient to perform an assistance feature, such as invoking visual and/or audio alert functionality of the recipient. As another example, the event alert 202 may include a command requesting the recipient device to, in turn, make a request to another device for assistance.

The vehicle 100-A may be in communication over the communications network 204 with a mobile device 206. The communications network 204 may include one or more interconnected networks, such as a cellular network, a cable network, a satellite network, a wide area wireless network, a Wi-Fi network, as some possibilities. In an example, the vehicle 100-A may be configured to communicate over the communications network 204 using the telematics control unit 112-D via an internal modem. The mobile device 206 may include one or more of various types of device configured to communicate with other devices over the communications network 204. As some possibilities, the mobile device 206 may include a mobile phone, a tablet computer, a portable digital assistant device, a laptop computer, or a desktop computer.

As illustrated, the vehicle 100-A may be configured to send an event alert 202-A to a predefined mobile device 206 to which the vehicle 100-A is configured to send event alerts 202. In an example, the vehicle 100-A may send a text message or make a phone call to the mobile device 206 to alert the owner of the mobile device 206 of the thermal event detected by the vehicle 100-A.

The two-way key fob 208 may be a device configured to send and receive messages with the vehicle 100-A. For example, the two-way key fob 208 may be configured to send commands to the vehicle, e.g., to cause the vehicle 100-A to lock or unlock vehicle 100-A doors, perform a remote start of the vehicle 100-A, open the vehicle 100-A trunk, open the vehicle 100-A tailgate, etc. The two-way key fob 208 may be further configured to receive event alert 202 messages from the vehicle 100-A as well, and may be configured to include alert functionality that activates upon receipt of the event alert 202. In an example, the alert functionality of the two-way key fob 208 may include a sounder device configured to produce an audible warning, a haptic device configured to provide a vibration warning, and/or a light emitting device configured to provide a visual warning.

As illustrated, the vehicle 100-A may be configured to send an event alert 202-B to a predefined two-way key fob 208 to which the vehicle 100-A is paired with to receive commands and send event alerts 202. In an example, the vehicle 100-A may send the event alert 202-B of the thermal event detected by the vehicle 100-A to the two-way key fob 208 in an attempt to alert the owner of the vehicle 100-A of the detected condition.

As a further possibility, the vehicle 100-A may be configure to perform vehicle-to-vehicle communication with another vehicle 100-B, in order to inform the other vehicle 100-B of the detected event. In an example, the vehicle 100-A may utilize the radio transceiver module 112-C to send the event alert 202-B of the thermal event detected by the vehicle 100-A to be received by the radio transceiver module 112-C of the vehicle 100-B. In another example, the vehicle 100-A may utilize the telematics control unit 112-D to send the event alert 202-B of the thermal event detected by the vehicle 100-A to be received by the telematics control unit 112-D of the vehicle 100-B.

Figure 3:
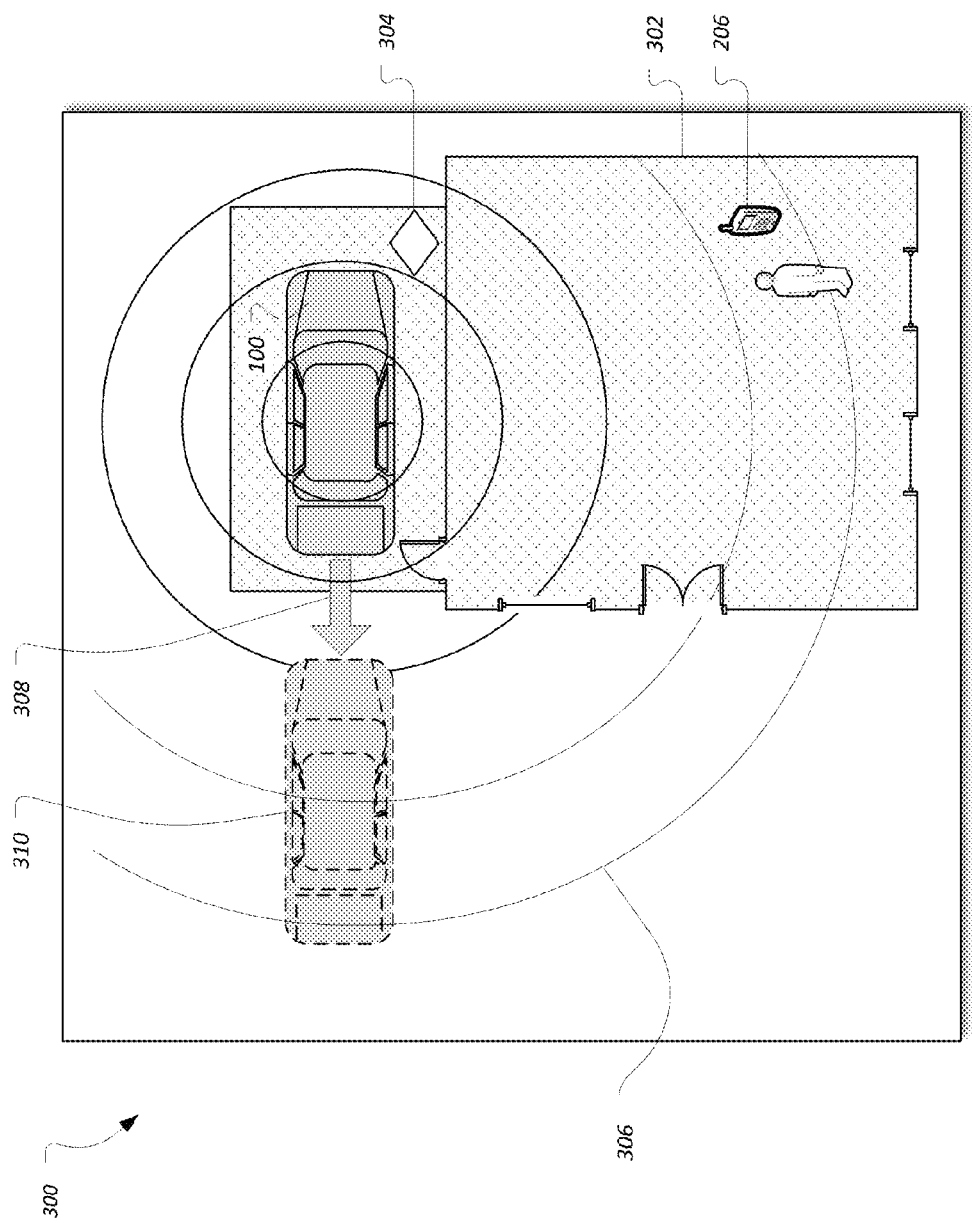
FIG. 3 illustrates an example diagram of a vehicle utilizing assistance features to attempt to mitigate a detected thermal event.

FIG. 3 illustrates an example diagram 300 of a vehicle 100 utilizing assistance features to attempt to mitigate a detected thermal event. As illustrated, the vehicle 100 is located at an initial position inside a garage of a structure 302. In an example, the vehicle 100 may utilize the global positioning system module 112-F to determine the location of the vehicle 100 at key-off, and may determine, based on that location, that assistance features should be enabled.

While parked, the thermal sensor 116 of the vehicle 100 may detect a potential thermal event 304, and may wake the vehicle connectivity module 118 of the vehicle 100. Once awake, the vehicle connectivity module 118 may activate the event detection application 124 included on the storage 122 of the vehicle connectivity module 118. In some cases, the event detection application 124 may utilize other sensor inputs of the vehicle 100 to confirm the unexpected thermal event, such as ambient temperature, cabin temperature, or sun load temperature information from the climate control management module 112-E, and/or engine temperature, oil temperature, coolant temperature, or other temperature information from the powertrain control module 112-A. If the a potential thermal event 304 is detected (and in some cases confirmed), the vehicle 100 may perform the assistance features that are enabled.

For example, and as illustrated by the concentric circles 306 emanating from the vehicle 100, the vehicle 100 may be configured to perform a notification assistance feature such as sending a message to a predetermined mobile device 206 specified by the vehicle 100 settings.

As another example, the vehicle 100 may be configured to perform assistance features configured to mitigate the detected thermal event 304. As an example, and as illustrated by the arrow 308 and potential moved vehicle position 310, the vehicle 100 may be configured to, upon detection of the thermal event 304, open the garage door of the structure 302. For instance, the vehicle 100 may utilize the vehicle connectivity module 118 to command the radio transceiver module 112-C (or another dedicated radio module) to provide a wireless Homelink message to open the garage door. The vehicle 100 may be further configured to, start the vehicles engine 104 of the vehicle 100 (e.g., via the starter motor 106 and ignition 108), and autonomously move the vehicle 100 out of the structure 302 (e.g., back up out of the opened garage door).

By moving the vehicle 100 from the structure 302, the vehicle 100 may accordingly attempt to protect itself from damage from the thermal event 304. Additionally, by moving from the thermal event 304 the vehicle 100 may to continue to be an information relay for the ongoing the status of the thermal event 304, and at the moved location may provide an improved vantage point for vehicles 100 cameras to view and transmit media of the thermal event 304 (e.g., via the telematics control unit 112-D to a predetermined recipient (e.g., a mobile device 206 of a vehicle owner, a call center, etc.).

Moreover, by moving the vehicle 100 from the structure 302, the vehicle 100 may facilitate location of the thermal event 304 by neighbors or personnel if the vehicle 100 is located outside the structure 302 with one or more visual and audio alert functions activated (e.g., hazard lights, flashing lights, alarm sounding, etc.). As another possibility, the moved vehicle 100 may provide shelter from the thermal event 304 for occupants making an exit from the structure 302 (e.g., if the structure occupants are not clothed properly and weather is severe, the moved vehicle 100 may provide the exited structure occupants with shelter until other personnel arrive which could be useful in rural locations or severe storms). As yet a further possibility, the vehicle 100 exited from the structure 302 may be available as a means of transportation for exited structure occupants.

Figure 4:
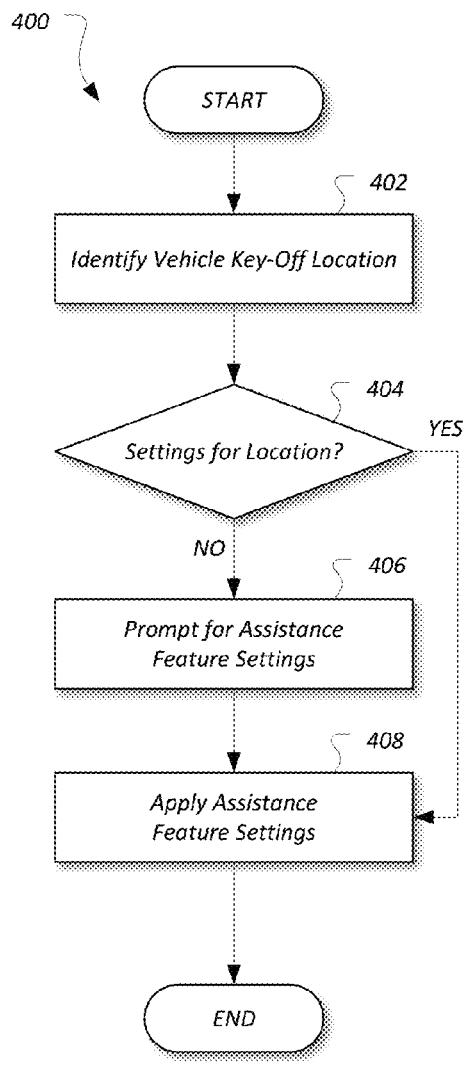
FIG. 4 illustrates an example process for setting assistance feature settings for a vehicle according to a static vehicle location such as a vehicle key-off location.

FIG. 4 illustrates an example process 400 for setting assistance feature settings 126 for a vehicle according to a static vehicle location such as a vehicle key-off location. The process 400 may be performed, in an example, at least in part by the vehicle connectivity module 118 of the vehicle 100.

At operation 402, the vehicle 100 identifies the vehicle 100 key-off location. In an example, the vehicle 100 may utilize the global positioning system module 112-F to determine a GPS location of the vehicle 100 at key-off.

At operation 404, the vehicle 100 determines whether the vehicle 100 has assistance feature settings 126 for the current location. For example, the vehicle 100 may query the assistance feature settings 126 to determine whether the vehicle 100 is within a range (e.g., 500 meters) of a pre-defined home location for which assistance feature settings 126 are set, whether the vehicle 100 is within a pre-defined range of any house, condo, or other habitable building (e.g., determined according to map information and the current GPS location) for which assistance feature settings 126 are set, or whether the vehicle 100 is parked in a location where assistance feature settings 126 have been disabled (e.g., a public parking lot). If the assistance feature settings 126 indicate that there are assistance feature settings 126 for the current location, control passes to operation 408. Otherwise control passes to operation 406.

At operation 406, the vehicle 100 prompts for assistance feature settings 126 for the current location. In an example, the human-machine interface (HMI) of the vehicle 100 may be configured to confirm via user input whether assistance features should be enabled at the current vehicle location (and/or which features should be enabled). The vehicle connectivity module 118 may accordingly utilize the input to the HMI to update the assistance feature settings 126 for the current location.

At operation 408, the vehicle 100 applies assistance feature settings 126 for the current location. For example, the vehicle connectivity module 118 may configure itself to utilize the assistance feature settings 126 defined for the current location in case of detection of a thermal event. After operation 408, the process 400 ends.

Figure 5:
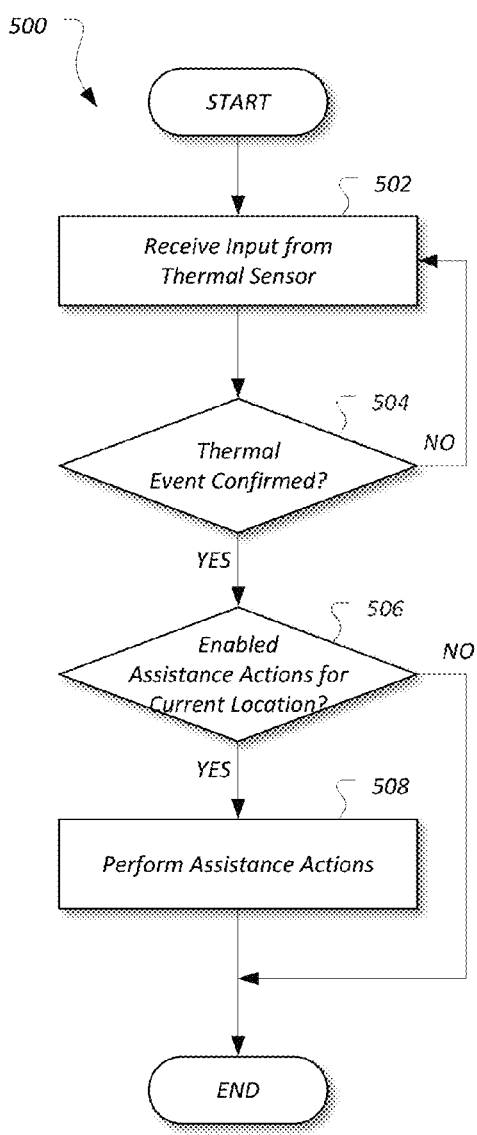
FIG. 5 illustrates an example process for performing assistance features activated based on unexpected thermal event detection.

FIG. 5 illustrates an example process 500 for performing assistance features activated based on unexpected thermal event detection. The process 500 may be performed, in an example, at least in part by the vehicle connectivity module 118 of the vehicle 100.

At operation 502, the vehicle 100 receives input from the thermal sensor 116 indicative of a potential occurrence of a thermal event. For example, when the thermal sensor 116 detects the unexpected thermal event, the thermal sensor 116 may close a connection between the vehicle connectivity module 118 and the battery 102, so as to cause the vehicle connectivity module 118 to activate.

At operation 504, the vehicle 100 confirms the potential occurrence of the thermal event. For example, the vehicle connectivity module 118 may utilize other sensor inputs of the vehicle 100 to confirm the unexpected thermal event, such as ambient temperature, cabin temperature, or sun load temperature information from the climate control management module 112-E, and/or engine temperature, oil temperature, coolant temperature, or other temperature information from the powertrain control module 112-A. If the potential thermal event 304 is confirmed, control passes to operation 506. Otherwise control passes to operation 502.

At operation 506, the vehicle 100 determines what assistance actions are enabled for the current vehicle 100 location. For example, the vehicle connectivity module 118 may utilize a GPS location of the vehicle 100 captured by the global positioning system module 112-F and maintained by the vehicle connectivity module 118 and the assistance feature settings 126 to identify which assistance features are enabled for the current vehicles 100 location. If no assistance features are enabled, then the process 500 ends. If assistance feature are enabled, then control passes to operation 508.

At operation 508, the vehicle 100 performed the enabled assistance features. As an example, the vehicle connectivity module 118 may command the vehicle 100 to perform a notification assistance feature such as sending a message to a predetermined mobile device 206 specified by the vehicle 100 settings. As another example, the vehicle connectivity module 118 may command the vehicle 100 to perform an assistance feature to mitigate the detected thermal event 304, such as autonomously moving the vehicle 100 to another location. After operation 508, the process 500 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a thermal sensor; and
a vehicle connectivity module in communication with the thermal sensor and a plurality of vehicle systems and configured to
capture a current vehicle location at vehicle key-off,
retrieve assistance features settings related to the current vehicle location from a vehicle storage device,
perform assistance features in accordance with the assistance features settings, provide a prompt in a user interface to receive assistance features settings for the current vehicle location when the assistance features setting are not set for the current vehicle location, receive an indication, from the thermal sensor, indicative of detection of a thermal event external to the vehicle, and responsive to the detection, utilize at least one of the plurality vehicle systems to perform at least one assistance feature specified by the assistance features settings to provide notification of the thermal event.

2. The system of claim 1, wherein the vehicle connectivity module is further configured to access assistance feature settings associated with the vehicle connectivity module to identify the assistance feature to perform.

3. The system of claim 1, wherein the thermal sensor is wired between the vehicle connectivity module and a vehicle battery, such that when the thermal sensor detects the thermal event, the thermal sensor closes a circuit between the vehicle connectivity module and the vehicle battery.

4. The system of claim 1, wherein the vehicle connectivity module is further configured to confirm the detection of the thermal event by utilizing other thermal sensor inputs of the vehicle.

5. The system of claim 4, wherein the other thermal sensor inputs of the vehicle include ambient temperature, cabin temperature, or sun load temperature sensor inputs from a climate control management module, and engine temperature, oil temperature, or coolant temperature sensor inputs from a powertrain control module.

6. The system of claim 1, wherein the at least one assistance feature includes at least one of: (i) utilizing an in-vehicle modem to call an emergency phone number or a predefined emergency contact, (ii) invoking a vehicle alarm, (iii) sending an alert message to a two-way key fob, (iv) sending the alert message to the predefined emergency contact, or (v) sending the alert message to a second vehicle to request the second vehicle to aid in providing of at least one assistance feature.

7. The system of claim 1, wherein the at least one assistance feature further includes an assistance feature to mitigate the thermal event.

8. The system of claim 7, wherein the assistance feature to mitigate the thermal event includes at least one of: (i) opening a door to a structure in which the vehicle is located, and (ii) autonomously moving the vehicle out of the structure away from the thermal event.

9. A vehicle comprising
a user interface; and
a processor configured to
capture a current vehicle location at vehicle key-off,
retrieve assistance features settings related to the current vehicle location from a vehicle storage device,
perform assistance features in accordance with the assistance features settings,
provide a prompt in the user interface to receive assistance features settings for the current vehicle location when the assistance features setting are not set for the current vehicle location,
receive an indication, from a thermal sensor of the vehicle, indicative of detection of a thermal event external to the vehicle and within a structure in which the vehicle is located, and
responsive to the detection, performing assistance features including autonomously moving the vehicle out of the structure away from the thermal event.

10. The vehicle of claim 9, wherein the processor is further configured to open a door to the structure in which the vehicle is located to autonomously move the vehicle out of the structure.

11. The vehicle of claim 9, wherein the processor is further configured to activate a vehicle alarm function responsive to the detection.

12. The vehicle of claim 9, wherein the processor is further configured to confirm the detection of the thermal event by utilizing other thermal sensor inputs of the vehicle before performing the assistance features.

13. The vehicle of claim 9, wherein the processor is further configured to
confirm that the assistance features are enabled for the current location before performing the assistance features.

14. A method comprising:
capturing a current vehicle location;
retrieving assistance features settings related to the current vehicle location from a vehicle storage device;
performing at least one assistance feature in accordance with the assistance features settings responsive to an external thermal event;
activating a vehicle connectivity module responsive to detection of the thermal event by a vehicle thermal sensor;
confirming, by the vehicle connectivity module, the detection of the thermal event by utilizing other thermal sensor inputs of the vehicle;
responsive to the confirmation, commanding a vehicle system to perform the at least one assistance feature to provide notification of the thermal event to a user; and
providing a prompt in a vehicle user interface configured to receive assistance features settings for the current vehicle location when the assistance features settings are not set for the current vehicle location.

15. The method of claim 14, wherein the at least one assistance feature includes at least one of: (i) utilizing an in-vehicle modem to call an emergency phone number or a predefined emergency contact, (ii) invoking a vehicle alarm, (iii) sending an alert message to a two-way key fob, (iv) sending the alert message to the predefined emergency contact, or (v) sending the alert message to a second vehicle to request the second vehicle to aid in providing of the at least one assistance feature.

16. The method of claim 14, wherein the at least one assistance feature includes at least one of: (i) opening a door to a structure in which the vehicle is located, or (ii) autonomously moving the vehicle out of the structure away from the thermal event.

17. A method comprising:
responsive to detecting an external thermal event by a vehicle thermal sensor and confirming the event via other thermal inputs of the vehicle, commanding a vehicle system to perform assistance features using settings retrieved from vehicle storage for a captured current vehicle location to provide notification of the thermal event to a user; and
receiving the settings via a vehicle user interface prompt when no settings are set for the location.

18. The method of claim 17, wherein the at least one assistance feature includes at least one of: (i) utilizing an in-vehicle modem to call an emergency phone number or a predefined emergency contact, (ii) invoking a vehicle alarm, (iii) sending an alert message to a two-way key fob, (iv) sending the alert message to the predefined emergency contact, or (v) sending the alert message to a second vehicle to request the second vehicle to aid in providing of the at least one assistance feature.

19. The method of claim 17, wherein the at least one assistance feature includes opening a door to a structure in which the vehicle is located.

20. The method of claim 17, wherein the at least one assistance feature includes autonomously moving the vehicle out of the structure away from the thermal event.

* * * * *